United States Patent [19]

Fabere'

[11] 4,205,562
[45] Jun. 3, 1980

[54] THREADED BELLCRANK MOUNT
[75] Inventor: Raymond W. Fabere', Oswego, Ill.
[73] Assignee: Caterpillar Tractor Co., Peoria, Ill.
[21] Appl. No.: 872,869
[22] Filed: Jan. 27, 1978
[51] Int. Cl.² .......................... G05G 9/16; G05G 1/04
[52] U.S. Cl. .................................... 74/473 R; 74/512
[58] Field of Search ..................... 74/473 R, 475, 476, 74/477, 512

[56] References Cited
U.S. PATENT DOCUMENTS
2,575,379  11/1951  Benning ................................. 74/519
3,962,930  6/1976  Frazee ................................. 74/473 R Primary Examiner—Allan D. Hermann
Attorney, Agent, or Firm—Hubert E. Dubb

[57] ABSTRACT

An improvement in a linkage assembly which comprises a bellcrank pivotally mounted on a stationary shaft. The improvement comprises first screw threads on the stationary shaft and second screw threads on the bellcrank mating with the first screw threads to form the pivotal mounting of the bellcrank to the stationary shaft while substantially preventing axial motion of the bellcrank relative to the stationary shaft in the absence of relative flotation therebetween. Any play or looseness in the motion of the bellcrank is thereby substantially eliminated.

1 Claim, 5 Drawing Figures

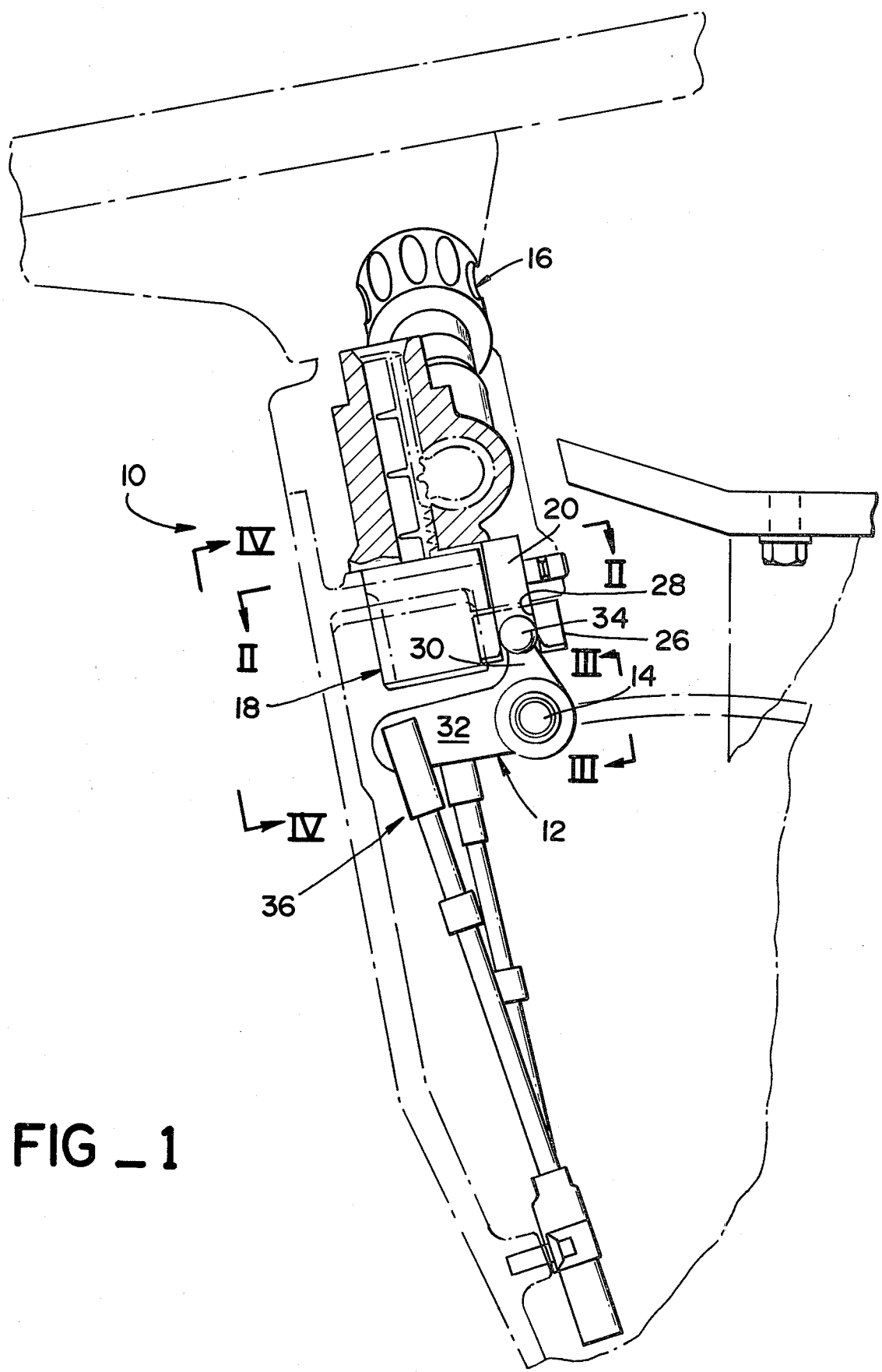
FIG_1

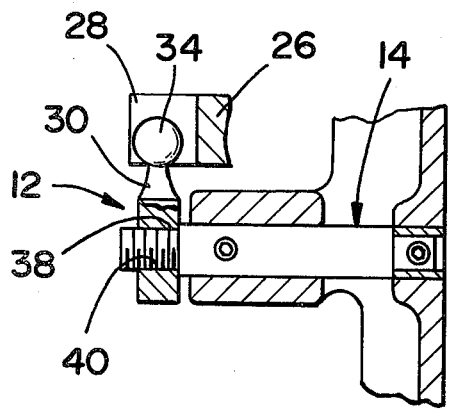
FIG_3
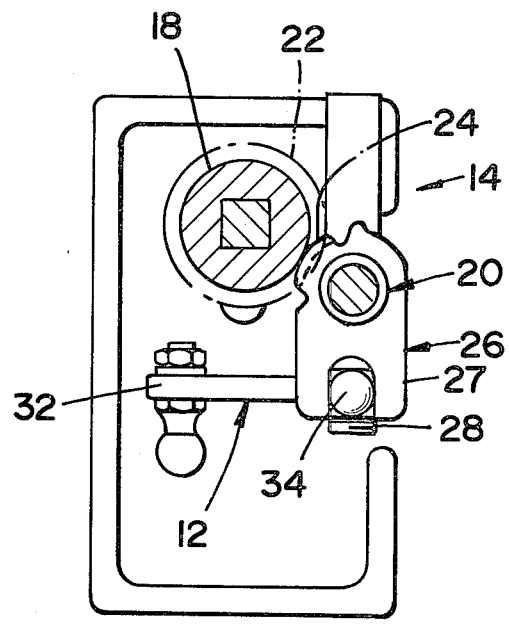
FIG_2
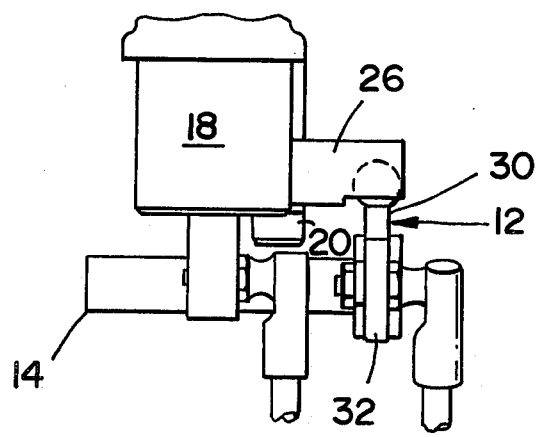
FIG_4
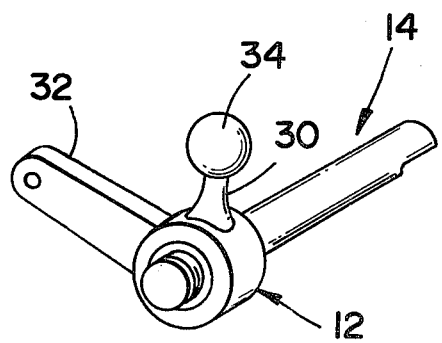
FIG_5

THREADED BELLCRANK MOUNT

BACKGROUND OF THE INVENTION

1. Field of the Invention

The invention relates to a bellcrank and more particularly to its pivotal mounting to a stationary shaft. Such bellcranks are used in linkage assemblies and in particular in gearshift assemblies.

2. Prior Art

It is customary in the art to mount bellcranks pivotally on stationary shafts. Generally, the mounting of the bellcranks on the stationary shaft has been via use of snap rings or the like. Due to usual manufacturing tolerances the bellcranks having a tendency to have a certain amount of free play or looseness. This creates a distinct problem since it is very desirable to have the movement of such a bellcrank quite responsive to the movement of a control lever or the like. For example, in gear shift assemblies when a gear shift lever or knob is rotated it is desirable that a bellcrank in such an assembly rotate directly with the gear shift lever or knob so that the gears will be shifted in a positive manner. This has heretofore been impossible because of the aforementioned free play in such bellcranks due to the manufacturing tolerances thereof.

SUMMARY OF THE INVENTION

The present invention is directed to overcoming one or more of the problems as set forth above.

According to the present invention an improvement is provided in a linkage assembly which includes a gear shift assembly which rotates a main shaft about the main shaft axis on shifting thereof and a bellcrank pivotally mounted on a crank mounting stationary shaft, said bellcrank having a first arm and a second arm each extending from said pivotal mounting of said crank mounting stationary shaft. The improvement comprises first screw threads on said crank mounting stationary shaft and second screw thread on said bellcrank mating with said first screw threads to form said pivotal mounting of said bellcrank to said crank mounting stationary shaft while substantially preventing axial motion of said bellcrank relative to said crank mounting stationary shaft in the absence of relative rotation therewith, and gear shift linkage means attached to said second arm for moving longitudinally with respect to said main shaft responsive to rotation of said bellcrank.

BRIEF DESCRIPTION OF THE DRAWING

The invention will be better understood by reference to the figures of the drawings wherein like numbers denote like parts throughout and wherein:

FIG. 1 illustrates, partially in sectional view, a linkage assembly, and more particularly a gear shift assembly, utilizing the improvement of the present invention;

FIG. 2 illustrates a view taken along the line II—II of FIG. 1; FIG. 3 illustrates a view taken along the line III—III of FIG. 1;

FIG. 4 illustrates a view taken along the line IV—IV of FIG. 1; and

FIG. 5 illustrates in perspective the improvement of the present invention.

DETAILED DESCRIPTION OF THE PREFERRED EMBODIMENT

The following description will illustrate the improvement of the present invention and its advantages in use with a gear shift assembly since the improvement was invented for that usage. It should be understood, however, that the improvement of the present invention is also useful in other linkage assemblies and that casting the description in terms of the gear shift assembly is for convenience and is not meant to be limiting in way upon the scope of the invention.

Adverting to FIGS. 1 and 2 there is illustrated therein a linkage assembly 10 which comprises a bellcrank 12 pivotally mounted on a crank mounting stationary shaft 14. On mounting fore and aft of a gear shift knob 16, a main shaft 18 is motivated to rotate about its axis. Rotation of the main shaft 18 causes a member 26 to rotate about a member mounting stationary shaft 20 due to meshing of teeth 22 on the main shaft 18 with teeth 24 on the member 26. The member 26 is pivotally attached to the member mounting stationary shaft 20 and extends radially outwardly therefrom. A radially extending slot 28 is provided in the member 26 at a position removed from the member mounting shaft 20.

The bellcrank 12, as previously mentioned, is pivotally mounted on the crank mounting stationary shaft 14. It will be noted that the bellcrank 12 comprises a first arm 30 and a second arm 32 each of which extend from the pivotal mounting to the crank mounting stationary shaft 14. The first arm 30 includes thereon means for slidingly engaging with the slot 28 whereby rotation of the main shaft 18 causes rotation of the member 26 about member mounting stationary shaft 20 and thereby rotation of the bellcrank 12 about the crank mounting stationary shaft 14. In the particular embodiment illustrated the means for slidingly engaging the first arm with the slot comprises a ball 34 which slidingly fits within the slot 28.

The second arm 32 of the bellcrank 12 has gear shift linkage means 36 attached thereto. Such attachment is normally pivotal as by use of a conventional ball joint arrangement. Accordingly, as the knob 16 is moved fore and aft the main shaft 18 will be rotated which in turn will cause the member 26 to be rotated about the member mounting stationary shaft 20 whereby the bellcrank 12 will be rotated causing the gear shift linkage means 36 to move upwardly or downwardly as illustrated in FIG. 1. The overall assemblage from the knob 16 through the gear shift linkage means 36 and including the intervening parts thereof thus comprises a gear shift assembly which comprises the linkage assembly 10.

Turning now most particularly to FIG. 3, the improvement of the present invention will be described. Briefly, first screw threads 38 are provided on the crank mounting stationary shaft 14 at the pivotal mounting thereof to the bellcrank 12. Second screw threads 40 are provided on the bellcrank 12 with the second screw threads 40 mating with the first screw threads 38. Thereby, the aforementioned pivotal mounting of the bellcrank 12 to the crank mounting stationary shaft 14 is accomplished. It is clear that relative rotation can occur between the bellcrank 12 and the crank mounting stationary shaft 14 without any significant restriction. On the other hand, it is equally clear that axial motion of the bellcrank 12 relative to the crank mounting stationary shaft 14 is substantially prevented by the meshing of the first screw threads 38 with the second screw threads 40 except in the case when the bellcrank 12 is rotated relative to the crank mounting stationary shaft 14. It is further clear that such an arrangement substantially completely eliminate any play or looseness in the movement of the bellcrank 12 on movement of the knob 16. Thus, the gear shift linkage means 36 are moved directly responsively to movement of the knob 16. This provides a positive action in the linkage assembly 10 which is superior to that previously attained when a bellcrank such as the bellcrank 12 was held upon a stationary shaft such as the crank mounting stationary shaft 14 solely by snap rings placed on either side of the bellcrank.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The embodiments of the invention in which an exclusive property or privilege is claimed are defined as follows:

1. In a linkage assembly which includes a gear shift assembly which rotates a main shaft about a main shaft axis on shifting thereof and a bellcrank pivotally mounted on a crank mounting stationary shaft, said bellcrank having a first arm and a second arm each extending from said pivotal mounting of said stationary shaft, an improvement comprising:
   a member pivotally attached to and extending radially outwardly from a member mounting stationary shaft;
   a radially extending slot in said member;
   means on said first arm for slidingly engaging with said slot whereby rotation of said main shaft about said main shaft axis causes rotation of said bellcrank about said crank mounting stationary shaft;
   first screw threads on said crank mounting stationary shaft;
   second screw threads on said bellcrank mating with said first screw threads to form said pivotal mounting of said bellcrank to said crank mounting stationary shaft while substantially preventing axial motion of said bellcrank relative to said crank mounting stationary shaft in the absence of relative rotation therebetween; and,
   gear shift linkage means attached to said second arm for moving longitudinally with respect to said main shaft responsive to rotation of said bellcrank.

* * * * *